Dec. 31, 1940.  F. W. SCHWINN  2,227,232
BICYCLE SPROCKET MOUNTING
Filed March 4, 1939
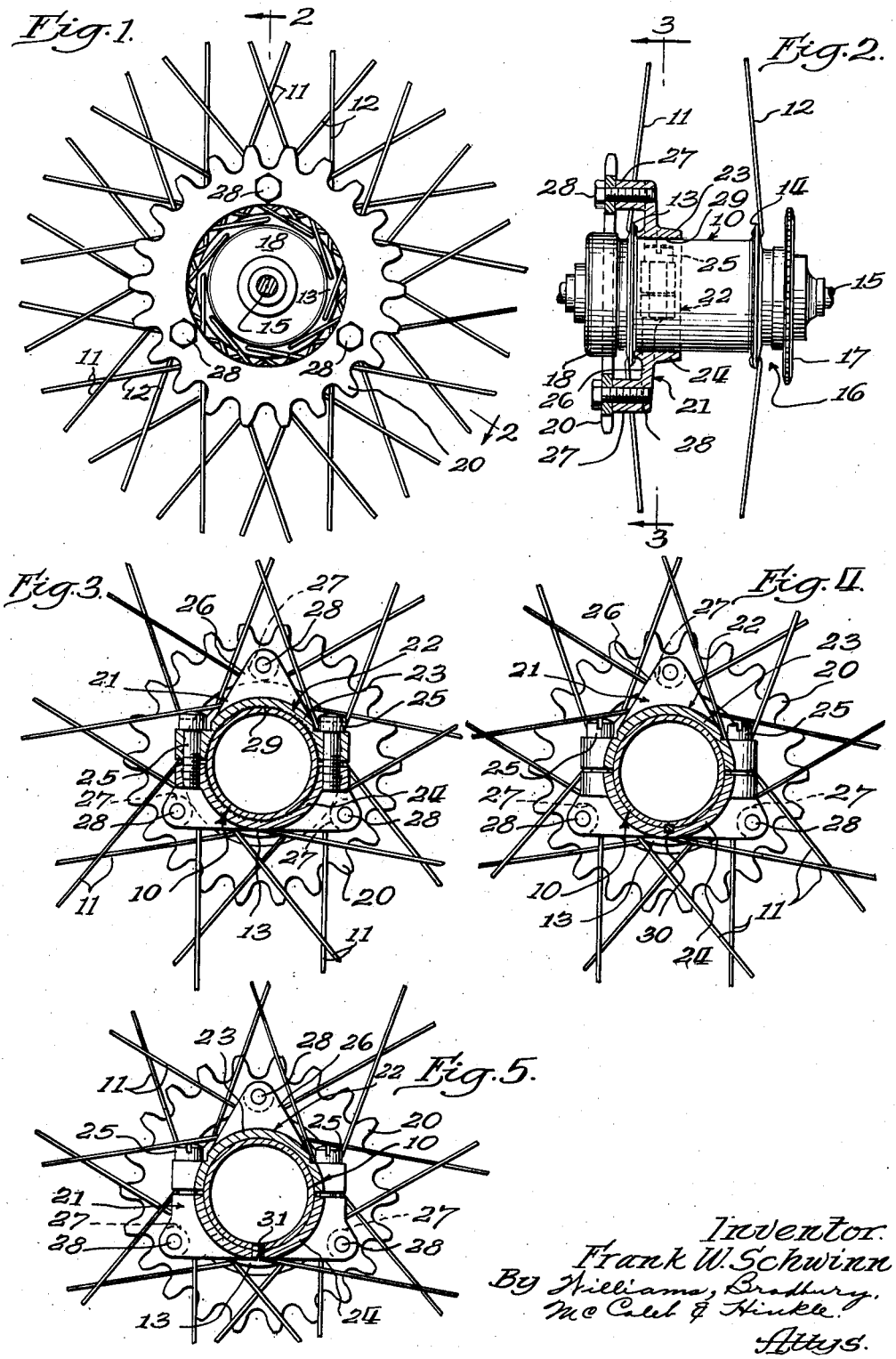
Inventor.
Frank W. Schwinn
By Williams, Bradbury,
McCaleb & Hinkle.
Attys.

Patented Dec. 31, 1940

2,227,232

UNITED STATES PATENT OFFICE 2,227,232

BICYCLE SPROCKET MOUNTING

Frank W. Schwinn, Chicago, Ill.

Application March 4, 1939, Serial No. 259,740

2 Claims. (Cl. 301—6)

My invention relates to bicycle sprocket mountings. When a driving motor is mounted in the frame of a bicycle to convert it into a motorcycle, there arises the problem of mounting a sprocket on the rear wheel for the chain power drive from the motor. When a coaster brake is employed, the sprocket for the pedal chain comes just beyond one end of the hub shell and since the pedal driven sprocket does not always rotate with the wheel, the power driven sprocket cannot be attached thereto. The opposite end of the coaster brake hub assembly likewise does not always rotate with the wheel, so that the power driven sprocket cannot be mounted on it. It is still advisable to have the power driven sprocket on the opposite side of the wheel from the pedal driven sprocket to avoid the congestion of two chains and sprockets operating so close together.

For these reasons it is desirable to have the power driven sprocket disposed at the side of the wheel opposite from the pedal driven sprocket and, of course, disposed outwardly of the spokes, but mounted upon the hub shell of the wheel and intermediate the two sets of spokes where there is more room for attachment to the hub shell. This in turn presents the problem of a mounting for the power driven sprocket which attaches to the hub shell intermediate the sets of spokes and which extends between the spokes of one set so that the power driven sprocket may lie outwardly of the spokes.

One of the chief objects of my invention is a mounting for such a power driven sprocket which is readily applied to the hub shell of the wheel and yet will definitely preclude relative rotation of the sprocket mounting and the hub shell of the wheel to eliminate danger of bending or breaking any of the spokes of the set of spokes through which the mounting must pass outwardly.

Another object of my invention is the provision of a mounting for such a power driven sprocket which is of structurally improved design, strength and convenience.

The foregoing together with further objects, features and advantages of my invention are set forth in the following description of specific embodiments thereof which are illustrated in the accompanying drawings, wherein:

Fig. 1 is an elevation of the central portion of the rear wheel of a bicycle embodying my invention and looking toward the power driven sprocket side of the wheel;

Fig. 2 is a vertical diametrical section taken on the line 2—2 of Fig. 1, showing the power driven sprocket and its mounting in section, but the hub shell of the wheel, the coaster brake hub, and the pedal driven sprocket in elevation;

Fig. 3 is a transverse section through the hub taken on the line 3—3 of Fig. 1, the coaster brake hub parts within the hub shell of the wheel being removed;

Fig. 4 is a view similar to Fig. 3, but taken on a slightly displaced plane showing a modified form of anchorage of the power driven sprockets to the hub shell; and Fig. 5 is a view similar to Fig. 4, but showing another modification.

Referring to Figs. 1, 2 and 3, I have shown the hub shell 10 of the rear wheel of a bicycle with right and left sets of spokes 11 and 12 extending from the wheel rim (not shown) to the right and left spoke flanges 13 and 14, respectively, at the ends of the hub shell. The hub shell 10 is journaled on the rear axle 15 by means of bearings (not shown) incorporated in a Morrow type coaster brake unit, indicated generally as 16, which incorporates at one end a pedal drive sprocket 17 and at the other end a head or cap 18 outwardly of the hub shell 10.

A power driven sprocket 20 is positioned at the left side of the wheel outwardly of the spokes 11 and surrounding, and more or less in the plane of, the cap or head 18 of the coaster brake unit. It will be understood that the power driven sprocket 20 is driven by a chain passing forwardly along the left side of the wheel to the drive sprocket of a motor mounted on the frame or, optionally, the power drive chain could extend upwardly to a motor mounted above the rear wheel.

For mounting the power driven sprocket 20 in the position described, but from the hub shell 10 intermediate its spoke flanges, I provide a sprocket mounting 21. This sprocket mounting 21 comprises a sleeve 22 encircling the wheel hub 10 and diametrically split into halves 23 and 24 clamped together by cap screws 25. The clamping screws pass through holes in the eared ends of the sleeve half 23 and are threaded into registering holes in corresponding ears in the sleeve half 24. The sprocket mounting 21 incorporates a vertical triangular plate 26 which at each of its apices carries an outwardly extending boss 27 internally threaded to receive one of the cap screws 28 by which the power driven sprocket 20 is fixed to the sprocket mounting 21. As shown, one point of the triangular plate 26 and its associated boss 27 is conveniently carried by the sleeve half 23 as an integral part thereof, while the other two points of the plate and their associated bosses are carried by the other sleeve half 24.

The bosses 27 and also the shanks of the cap screws 24 in extending from the power driven sprocket 20, which is outwardly of the set of spokes 11, to the plate 26, which is intermediate the sets of spokes 11 and 12, pass intermediate spokes in the set 11 and previously out of contact therewith. Although the sprocket mounting may include a plurality of bosses and mounting screws other than the three shown, I consider that three is preferable as being the minimum consistent with good engineering design.

To prevent relative rotation of the sprocket mounting 21 and the hub shell 10 of the wheel, I provide a multiplicity of longitudinal serrations 29 in the cylindrical bore of the sleeve 22. Under compression by the clamping screws 25, the sleeve halves 23 and 24 are pulled together tightly enough to cause the serrations to bite into the metal of the hub shell 10.

In the modification of Fig. 4, I employ a Woodruff key 30 in lieu of, or in addition to, the serrations 29, and in the modification of Fig. 5 I use a locking pin or screw 31 positively to hold the sleeve against rotation upon the hub shell.

I prefer to use only the serrations 29 of Fig. 3, rather than the modifications of Figs. 4 and 5, for three reasons. First, the mounting may be applied to a standard hub shell 10 without slotting or drilling it. Second, if the motor drive is to be removed, the power driven sprocket and its mounting may be removed, leaving the hub shell practically undefaced without any opening through which water or dirt might pass to the interior. Third, the serrations give more of a safety feature. Unless perhaps the sleeve halves are clamped too tightly, an unusual severe jerk upon the sprocket mounting, as, for example, by a back firing of the motor or a binding of the drive chain, may cause some slight slippage of the mounting sleeve upon the hub shell sufficient to relieve any parts from breakage. Should this happen, the sprocket mounting may readily be reset by temporarily loosening the clamping screws 25. Even if the slippage should result in breaking some of the spokes, their replacement is more convenient and less expensive than the replacement of the sprocket mounting or of the wheel hub, either or both of which might be irreparably damaged when the positive key, screw or pin anchorages of Figs. 4 and 5 are used.

My power driven sprocket mounting is especially advantageous as part of equipment to be sold as a separate accessory whereby a standard bicycle may be converted into a motorcycle, since the application of the sprocket mounting involves no alteration (and in the case of the forms of Figs. 4 and 5, but little alteration) in a standard bicycle.

While I have described and illustrated these specific embodiments of my invention, I contemplate that many changes may be made thereover without departing from the scope or spirit of my invention.

I claim:

1. In a bicycle rear wheel assembly comprising a hub shell having spoke flanges, right and left sets of spokes emanating therefrom, a ring sprocket for a power chain disposed concentrically of the hub shell and outwardly of the set of spokes at one side of the wheel, a pedal sprocket on the other side of the wheel, a mounting device for the ring sprocket comprising a sleeve having a bore to fit the mid region of the hub shell, the sleeve being diametrically split into halves, screws for clamping the halves together about and against the hub shell, three arcuately spaced ears extending outwardly from the sleeve in the plane of the wheel, one ear being integral with one sleeve half and the other two with the other sleeve half, a transverse tubular lug carried by each ear and extending outwardly therefrom for end engagement with the inner face of the ring sprocket and disposed to pass between, but free of, the spokes and closely adjacent their spoke flange, screws for passing through holes in the ring sprocket and into the interior of the hollow lugs rigidly to attach the ring sprocket to the sleeve and thereby to the hub shell, and element means at the bore of the sleeve turning with the sleeve and interengaging with the hub shell for effecting a positive drive between the sleeve and hub shell, said element mans being yieldable under extreme resistance for the purpose described.

2. A mounting device according to claim 1, wherein the element means consist of serrations in the bore of the sleeve adapted to bite into the surface of the hub shell under the clamping force of the clamping screws.

FRANK W. SCHWINN.